Oct. 20, 1970 W. H. RAYNER 3,535,578
SPARK EROSION MACHINES
Filed June 28, 1967
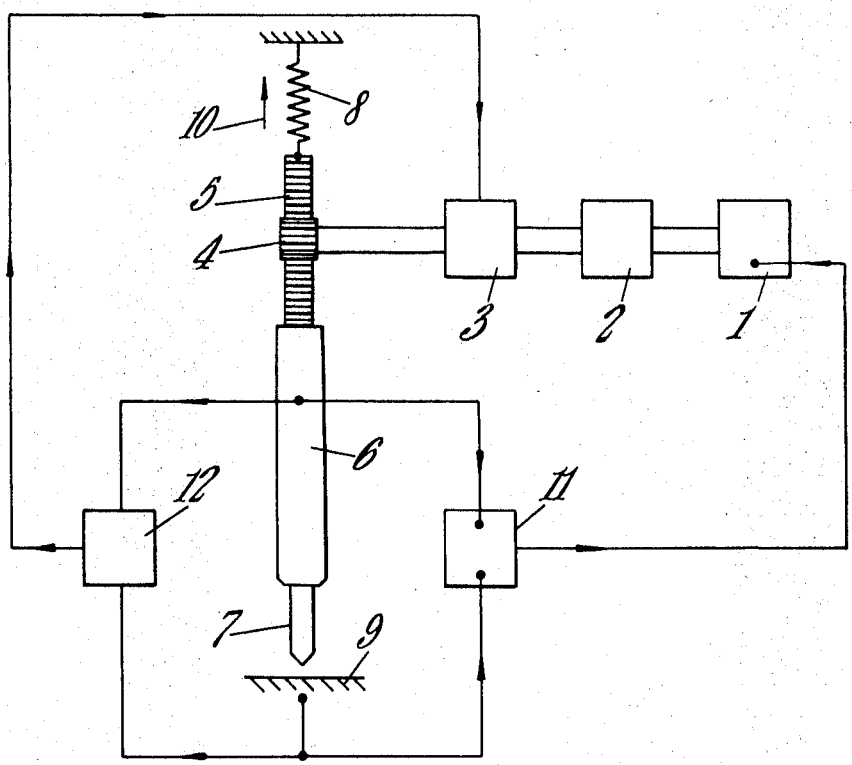

United States Patent Office 3,535,578
Patented Oct. 20, 1970

3,535,578
SPARK EROSION MACHINES
William Herbert Charles Rayner, High Wycombe, England, assignor to Agemaspark Holdings Limited, High Wycombe, England, a British company
Filed June 28, 1967, Ser. No. 649,686
Claims priority, application Great Britain, July 1, 1966, 29,567/66
Int. Cl. B23p 1/12
U.S. Cl. 314—69                          2 Claims

ABSTRACT OF THE DISCLOSURE

An electrode drive mechanism for a spark erosion machine wherein a drive motor is provided for driving the electrode of the machine at least towards a workpiece in opposition to means constantly acting in a direction tending to move the electrode away, and coupling means for engaging and disengaging the drive arranged so that under short-circuited conditions of the spark-gap the effective drive to the electrode is disconnected to permit the electrode to be withdrawn away from the workpiece under the influence of the means tending to move the electrode away from the workpiece.

---

This invention relates to spark erosion machines and is concerned, more particularly, with an improved electrode drive mechanism for use in such machines.

The present invention consists in an electrode drive mechanism for a spark erosion machine wherein a drive motor is provided for driving the electrode of the machine at least towards a workpiece in opposition to means constantly acting in a direction tending to move the electrode away, and coupling means for engaging and disengaging the drive, such as an electromagnetic or electrostatic coupling, arranged so that under short-circulated conditions of the spark-gap the effective drive to the electrode is disconnected to permit the electrode to be withdrawn away from the workpiece under the influence of the means tending to move the electrode away from the workpiece.

The invention further consists in a spark erosion machine which includes an electrode drive mechanism as set forth in the preceding paragraph.

In carrying the invention into effect according to one convenient mode by way of example as shown in the accompanying diagrammatic drawing, an electrode drive mechanism for a spark erosion machine includes a main drive to the electrode of the machine consisting of an electrical servo motor 1 driving a reduction gear 2 which in turn drives an electromagnetic coupling 3 in the form of a magnetic particle coupling which in turn drives a pinion 4 meshing with a rack 5 fixed to the quill 6 holding the electrode 7.

The weight of the quill 6 and electrode 7 is more than counterbalanced by a spring 8 giving a constant pull so that when the clutch 3 is de-energized the spring 8 will move the electrode upwardly away from the workpiece 9 in the direction of arrow 10.

The electrical motor 1 is energized by a directional amplifier 11 fed from the spark gap in conventional manner so that when the gap is reduced below a desired value or even short-circuited the motor 1 is rotated in a direction tending to move the electrode away from the workpiece 9, and when the gap is increased above the desired value or even open-circuited the motor 1 is rotated in the opposite direction to restore the desired spark gap.

In addition to this control, the magnetic particle coupling 3 is energized by a triggering circuit 12 arranged so that the coupling is alternatively either engaged or disengaged, this circuit 12 also being fed from the spark gap so that when the gap is short circuited or reduced below the desired value the coupling 3 is de-energized permitting withdrawal of the electrode at a faster rate than that possible merely by reversing the electrical motor.

Under normal operating conditions, the coupling will tend to be energized and de-energized continuously and alternately at a sufficiently high rate to provide a slipping effect so as to apply a torque sufficient to balance the residual upward pull of the spring 8 and hold the electrode stationary, or nearly so, the electrical motor being rotated continuously in a direction tending to lower the electrode. In this way, the desired working spark gap is maintained but should short-circuited conditions arise then rapid withdrawal of the electrode will be performed in the manner described above.

If desired, the reversible motor 1 and thus the directional amplifier 11 may be replaced by a uni-directional motor rotating continuously in a direction tending to lower the electrode withdrawal of the electrode being performed solely by the residual upward pull of the spring 8.

Furthermore, if desired, the magnetic particle coupling may be replaced by an electrostatic coupling to achieve the same fast response or alternatively other suitable means may be provided for engaging and disengaging the drive such as a differential gear drive which can be engaged and disengaged.

Means other than the constant torque spring may be used for over counterbalancing the quill and electrode, and the pinion and rack drive may be replaced by any other suitable arrangement.

I claim:
1. An electrode drive mechanism for a spark erosion machine, which includes
 (a) a drive motor;
 (b) an electrode for co-operation with a workpiece;
 (c) a mechanical drive between said drive motor and said electrode, said drive including
  (i) a reduction gear, and
  (ii) electrically operable disengageable coupling means interposed between said gear and said electrode;
 (d) means constantly exerting a force upon said electrode in a direction away from the workpiece, said force being substantially constant irrespective of the position of the electrode;
 (e) control means for energizing and de-energizing said coupling means continuously and alternately so as to transmit controlled torque sufficient to balance the effect of said means constantly exerting a force and thereby normally maintain a stable operating condition; and
 (f) means connecting said control means electrically between the electrode and workpiece whereby said controlled torque may be varied upon departure from said stable operating condition to restore said stable operating condition.
2. An electrode drive mechanism according to claim 1, wherein a directional amplifier is connected between the electrode and workpiece and arranged to reverse the direction of rotation of the said drive motor in the event of a departure from the stable operating condition in the direction of a short-circuit.

References Cited

UNITED STATES PATENTS

| | | | |
|---|---|---|---|
| 2,588,744 | 3/1952 | McKechnie | 219—69 |
| 2,939,065 | 5/1960 | Matulaitis | 314—69 X |
| 3,213,235 | 10/1965 | Soos | 335—74 |
| 3,213,236 | 10/1965 | Pendy et al. | 335—74 |

BERNARD A. GILHEANY, Primary Examiner

R. N. ENVALL, Jr., Assistant Examiner

U.S. Cl. X.R.

219—69